United States Patent [19]
Ogawa

[11] Patent Number: 5,917,714
[45] Date of Patent: Jun. 29, 1999

[54] SWITCHING POWER SUPPLY WITH INPUT VOLTAGE REDUCTION DETECTION

[75] Inventor: Takahiro Ogawa, Osaka, Japan

[73] Assignee: Funai Electric Co., Ltd., Osaka, Japan

[21] Appl. No.: 09/086,228

[22] Filed: May 28, 1998

[30] Foreign Application Priority Data

May 29, 1997 [JP] Japan ..................................... 9-004487

[51] Int. Cl.⁶ ............................................... H02M 3/335
[52] U.S. Cl. .................................. 363/20; 363/21; 363/56
[58] Field of Search ............................... 363/20, 21, 56, 363/97, 131

[56] References Cited

U.S. PATENT DOCUMENTS

| | | |
|---|---|---|
| 3,675,115 | 7/1972 | O'Loughlin ............................... 363/21 |
| 5,291,386 | 3/1994 | Wu ............................................ 363/21 |
| 5,453,921 | 9/1995 | Shutts ....................................... 363/21 |
| 5,825,638 | 10/1998 | Shutts ....................................... 363/56 |

FOREIGN PATENT DOCUMENTS 3-169258  7/1991  Japan .

*Primary Examiner*—Jeffrey Sterrett
*Attorney, Agent, or Firm*—Lackenbach Siegel Marzullo Aronson & Greenspan, P.C.

[57] ABSTRACT

A switching power supply which takes out an output current from a secondary winding when a switching circuit for switching a current flowing through a primary winding is turned off and supplies a DC output to a load device having a control input for decreasing an amount of consumption power thereof. The switching power supply includes a voltage reduction detection circuit for detecting a voltage generated at the secondary winding when the switching circuit is in an on-state and for outputting to the control input a reduction signal representing reduction of an input voltage of the primary winding side when the detected voltage is out of a predetermined range.

4 Claims, 2 Drawing Sheets

SWITCHING POWER SUPPLY WITH INPUT VOLTAGE REDUCTION DETECTION

BACKGROUND OF THE INVENTION

1. Field of the Invention

The present invention relates to a switching power supply such as a ringing choke converter (RCC) type switching power supply or the like which takes out a current from a secondary winding when a switching circuit for switching a current flowing through a primary winding is turned off, and more particularly relates to a switching power supply which outputs a reduction signal representing the reduction of an input voltage of a primary side (a primary side input voltage) when the primary side input voltage reduces.

2. Description of the Related Art

In the RCC type switching power supply, when the voltage of the primary side DC power supply obtained by rectifying and smoothing the voltage of the commercial power supply system decreases, the operation area where the switching transistor is turned on is not in a completely saturated area. As a result, the collector-emitter voltage of the switching transistor increases when it is turned on. When the collector-emitter voltage of the switching transistor increases, the switching transistor may be broken due to the increase of an amount of heat generated by itself. In view of this matter, Japanese Patent Unexamined Publication No. Hei. 3-169258 proposes a technique for stopping the switching operation of the switching transistor when the voltage of the primary side DC power supply decreases.

In this technique, a series circuit formed by a resistor and a voltage regulation diode is connected between the positive terminal of a primary side power supply and the base of a primary side output transistor, whereby the series circuit formed by the resistor and the voltage regulation diode supplies a starting voltage to the primary side output transistor. According to such an arrangement, when the voltage of the primary side power supply decreases and no current flows into the voltage regulation diode, the primary side output transistor stops oscillating. Thus, such a phenomenon is prevented from being occurred that the primary side output transistor is broken due to the decrease of the voltage of the primary side power supply.

However, when the above conventional technique is applied to a switching power supply to which the DC power obtained by rectifying and smoothing the output of the commercial power supply system, there arises the following problem. That is, the voltage obtained by rectifying and smoothing the output of the commercial power supply system exceeds 100 volts (V). Thus, when the voltage of the DC power supply decreases below 60V, for example, it is required to stop the switching operation in order to prevent the breakage of the primary side output transistor. To this end, the voltage regulation diode is required to be one having a Zener voltage of 60V. However, since the Zener voltage of the voltage regulation diode is 30V or less in general, it is required to connect two voltage regulation diodes in series in order to obtain a voltage regulation diode having a Zener voltage of 60V, whereby the cost of the parts becomes expensive.

SUMMARY OF THE INVENTION

In view of the aforesaid conventional problem, an object of the present invention is to provide a switching power supply which is able to prevent the breakage of an element at the time of the reduction of a primary side input voltage with a simple circuit arrangement without using an expensive element.

In order to attain the aforesaid object, the present invention provides a switching power supply comprising: a primary winding; a switching circuit for switching a current flowing through the primary winding; a secondary winding from which an output current is taken out when the switching circuit is turned off; a load device which includes a control input for decreasing an amount of consumption power thereof and to which a DC output is supplied when the switching circuit is turned off; and a voltage reduction detection circuit for detecting a voltage generated at the secondary winding when the switching circuit is in an on-state and for outputting to the control input a reduction signal representing reduction of an input voltage of the side of the primary winding when the detected voltage is out of a predetermined range.

DETAILED DESCRIPTION OF THE PREFERRED EMBODIMENT

An embodiment of the present invention will be described with reference to the accompanying drawings.

Figure 1:
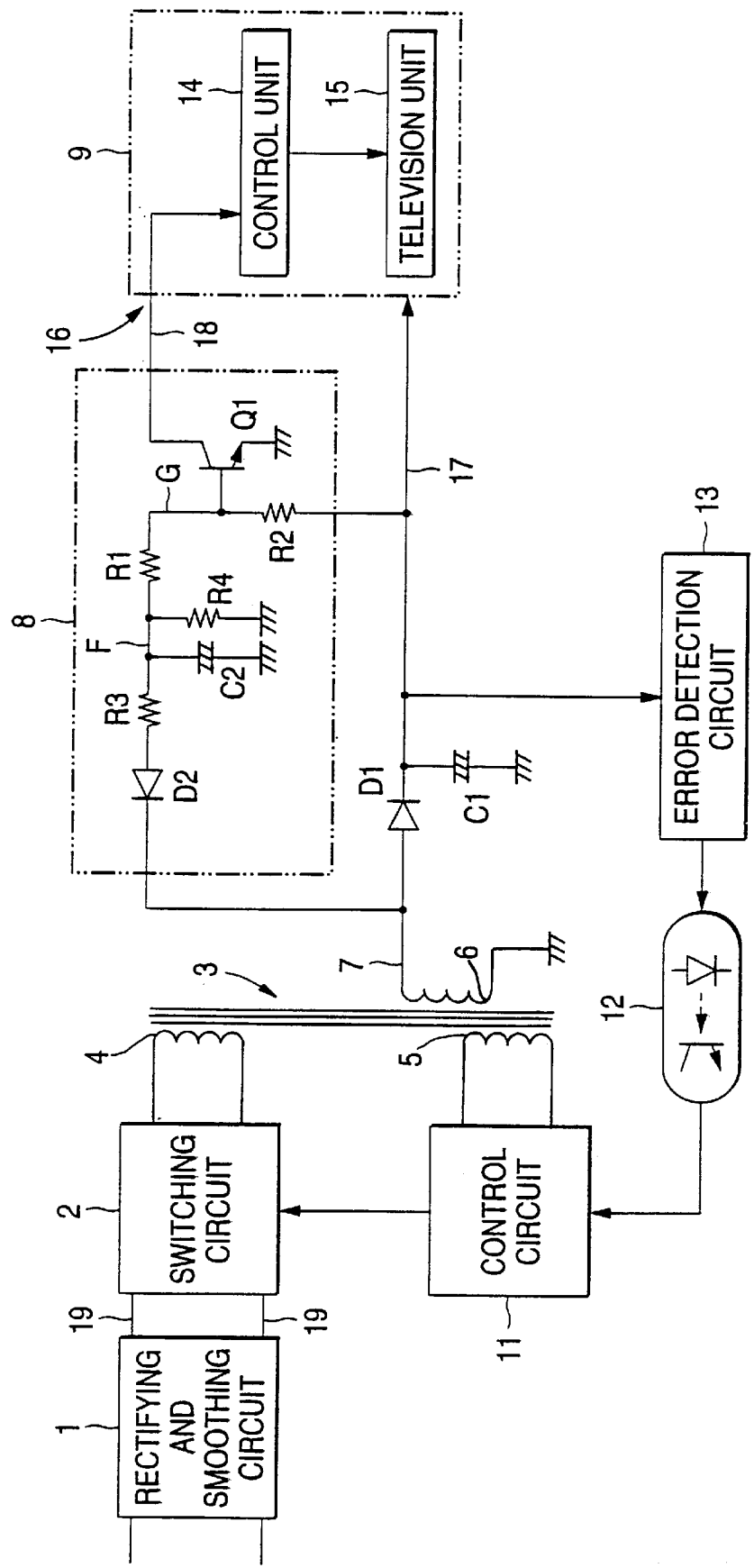
FIG. 1 is a block diagram showing the electrical arrangement of a switching power supply according to an embodiment of the present invention.

FIG. 1 is a block diagram showing the electrical arrangement of a switching power supply according to the embodiment of the present invention, in which case the present invention is applied to an RCC type switching power supply as an example.

In the figures a rectifying and smoothing circuit 1 includes a diode bridge and a smoothing capacitor, and rectifies and smoothes AC power inputted therein through a noise filter (not shown) or the like thereby to generate primary side DC power 19. The thus generated DC power 19 is supplied to a switching circuit 2.

The switching circuit 2 serves to switch the direction of the current flowing through a primary winding 4. To this end, the switching circuit 2 includes a switching transistor whose collector is connected to one terminal of the primary winding 4 of a transformer 3 and a start resistor for supplying starting current to the base of the switching transistor, and the like.

A control circuit 11 controls the current supplied to the base of the switching transistor within the switching circuit 2 so as to stabilize the voltage of DC output 17. To this end, the control circuit 11 controls the current supplied from an auxiliary winding 5 to the base of the switching transistor within the switching circuit 2 in accordance with the output current from a photo-coupler 12 by using a control transistor.

A diode D1 and a capacitor C1 form a rectifying and smoothing circuit which rectifies and smoothes the current taken out from a secondary winding 6 upon turning off of the switching circuit 2 thereby to generate the DC output 17.

An error detection circuit 13 includes a reference voltage generating circuit and the like and detects an error of the voltage of the DC output 17. The photo-coupler 12 is driven by the current corresponding to the detected error from the error detection circuit 13, so that the error of the DC output 17 is fed back to the control circuit 11 through the photo-coupler 12.

A voltage reduction detection circuit 8 detects a voltage generated at the secondary winding 6 when the switching circuit 2 is in an on-state. When the detected voltage is out of a predetermined range of voltage, the voltage reduction detection circuit 8 determines that the primary side input voltage (voltage of the primary side DC power 19) reduced and outputs a reduction signal 18 representing the reduction of the primary side input voltage to a load device 19.

The load device 9 is operated by the DC output 17 serving as an operation power. A concrete example of the load device 9 is a television set. The load device 9 reduces its consumption power when the reduction signal 18 is supplied to a control input 16 thereof. To this end, the load device 9 includes a control unit 14 and a television unit 15.

To be more specific, the control unit 14 is mainly formed by a microcomputer and controls the operation of the television unit 15. When the reduction signal 18 is supplied to the control input 16, the control unit 14 stops the operation of the television unit 15 and places the television unit in a standby state so as to reduce an amount of the consumption power of the DC output 17 at the load device.

The control input 16 is an input terminal of the load device 9 to which the output of the open collector is coupled in parallel, and the output of a detection circuit (not shown) for detecting the failure of a circuit of the television unit 15 is supplied to the load device 9 in parallel to the reduction signal 18.

A plurality of secondary windings (not shown) as well as the secondary winding 6 are also wound in the transformer 3. Rectifying and smoothing circuits are provided in correspondence to the not-shown plurality of secondary windings, respectively. That is, this embodiment is arranged so as to be able to output plural kinds of DC voltages.

Detailed arrangement of the voltage reduction detection circuit 8 will be described.

A diode D2 rectifies the voltage generated at the secondary winding 6 when the switching circuit 2 is an on-state. For this purpose, the cathode of the diode D2 is connected to a non-grounded side terminal 7 of the secondary winding 6. A resistor R3 whose one terminal is connected to the anode of the diode D2 limits a surge current flowing into a capacitor C2 at the time of turning-on of the power supply. The capacitor C2 has one terminal connected to the other terminal of the resistor R3 and the other terminal connected to the secondary side ground level. The capacitor C2 smoothes the voltage rectified by the diode D2. A resistor R4 connected in parallel to the capacitor C2 discharges the charge of the capacitor C2 within a predetermined time period.

The other terminal of the resistor R3 is connected to one terminal of a first resistor R1, while the other terminal of the first resistor R1 is connected to one terminal of a second resistor R2. The other terminal of the second resistor R2 is connected to the DC output 17. The base of a transistor Q1 is connected to a connection point G between the first resistor R1 and the second resistor R2. The emitter of the transistor Q1 is connected to the secondary side ground level. The collector of the transistor Q1 is connected to the control output 16 so as to output the reduction signal 18.

According to the aforesaid arrangement, the first resistor R1 and the second resistor R2 serve as a voltage dividing circuit for dividing the voltage difference between the voltage of the DC output 17 and the voltage at a connection point F between the resistor R3 and the capacitor C2. The divided voltage of the voltage dividing circuit is supplied to the base of the transistor Q1.

The reduction signal 18 is outputted when the path between the collector of the transistor Q1 and the secondary side ground is closed or made conductive.

Figure 2:
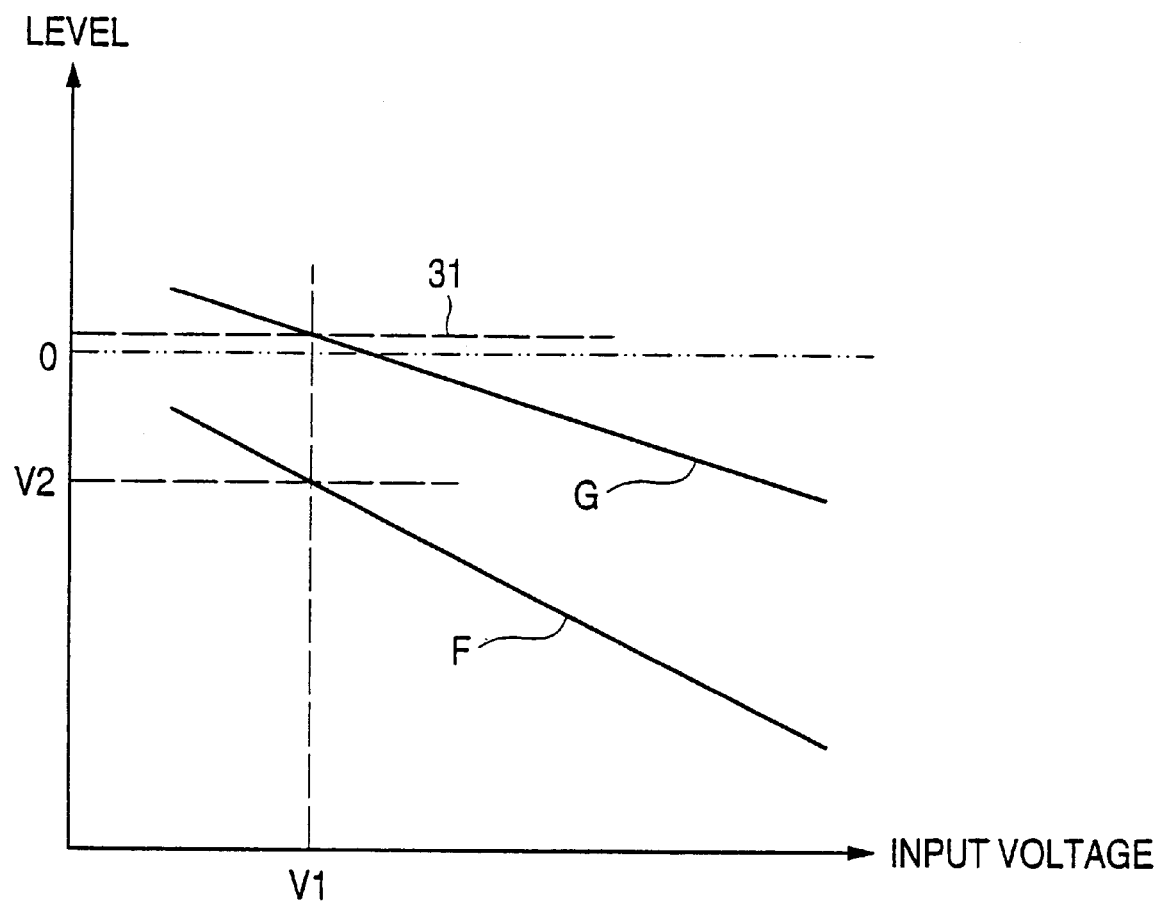
FIG. 2 is a diagram showing the relation between the change of the primary side input voltage and the voltage change at the main portions of a voltage reduction detection circuit.

FIG. 2 is a diagram showing the relation between the change of the primary side input voltage and the voltage change at the main portions of the voltage reduction detection circuit 8. The operation of the embodiment will be described with reference to FIG. 2.

Supposing that, when the switching circuit 2 is in an on-state, the voltage generated at the secondary winding 6 is E2, the voltage of the primary side DC power supply 19 (primary side input voltage) inputted into the switching circuit 2 is E1, the number of turns of the primary winding 4 is Np and the number of turns of the secondary winding 6 is Ns, the voltage E2 is expressed by $$E2 = E1 \times (Ns/Np).$$

In this case, since Ns/Np represents a ratio between the number of turns of the primary winding 4 and that of the secondary winding 6, this ratio is a constant value. Accordingly, the voltage generated at the secondary winding 6 is proportional to the primary side input voltage E1.

As a consequence, the voltage at the connection point F of the voltage reduction detection circuit 8 is proportional to the primary side input voltage. In other words, when the primary side input voltage increases, the voltage at the point F decreases in proportional to the increase of the primary side input voltage in a manner that the negative side voltage value increases in accordance with the increase of the primary side input voltage. In contrast, the voltage of the DC output 17 does not change even if the primary side input voltage changes. Accordingly, the voltage at the point G changes in proportional to the primary side input voltage. When the primary side input voltage decreases, the voltage at the point G changes from a negative value to a positive value.

When the primary side input voltage decreases below a voltage V1, there arises a possibility that the switching transistor of the switching circuit 2 may be broken due to the increase of the thermal loss of the switching transistor. Supposing that, of the changing range of the voltage at the point F, the negative side voltage range below a voltage V2 is a predetermined range, there is no possibility that the switching transistor may be broken when the voltage at the point F is within the predetermined range, while the switching transistor may be broken when the voltage at the point F is out of the predetermined range. In view of such a fact, the ratio between the values of the first and second resistors R1 and R2 is set in a manner that, when the voltage at the point F is the voltage V2, the voltage at the point G is a value (voltage value represented by reference numeral 31, that is, about 0.6 V) at which a current starts flowing into the base of the transistor Q1. Accordingly, the voltage reduction signal 18 is outputted when the primary side input voltage decreases below the voltage V1.

Since the voltage reduction detection circuit 8 operates in the aforesaid manner, when the primary side input voltage decreases below the voltage V1 due to the degradation of the commercial power supply system, the voltage reduction signal 18 is outputted. When the voltage reduction signal 18 is outputted, the control unit 14 stops the operation of the television unit 15 to place it in a standby-state. As a consequence, in this case, since only the control portion 14 is operated in the load device 9, an amount of consumption power decreases. When the amount of the consumption power of the load device 9 decreases, an amount of the loss of the switching transistor of the switching circuit 2 becomes smaller despite that the collector-emitter voltage of the switching transistor increases due to the decrease of the primary side input voltage. Thus, the switching circuit 2 continues to operate without causing the breakage of the switching transistor thereof.

Although, in the aforesaid embodiment, the commercial power supply system is used as the primary side input power supply, the present invention is not limited thereto. The present invention may be applied to the case where a battery or the like is used as the primary side input power supply.

Further, although, in the aforesaid embodiment, the description is made as to the case where the load device 9 having the control input for reducing an amount of the consumption power is a television set, the present invention may employ an arbitrary device such as a video cassette recorder (VCR) provided integrally with a television set, a VCR or the like as the load device 9.

Furthermore, although, in the aforesaid embodiment, the description is made as to the case where the other terminal of the second resistor R2 is connected to the DC output 17, the present invention may be applied to the case where the other terminal of the second resistor R2 is connected to another DC output (not shown).

As described above, the switching power supply according to the present invention is applied to such a switching power supply which takes out an output current from the secondary winding when the switching circuit for switching a current flowing through the primary winding is turned off and supplies a DC output to the load device having the control input for decreasing an amount of consumption power thereof. The switching power supply according to the present invention includes the voltage reduction detection circuit for detecting a voltage generated at the secondary winding when the switching circuit is in an on-state and for outputting to the control input the reduction signal representing reduction of the input voltage of the primary winding side when the detected voltage is out of the predetermined range.

That is, the reduction of the primary side input voltage is detected on the basis of the voltage generated at the secondary winding when the primary side switching circuit is turned on. When the reduction of the primary side input voltage is detected, the reduction signal for reducing an amount of power consumed in the load device is generated. As a consequence, the present invention is able to provide the switching power supply which is able to prevent the breakage of the element at the time of the reduction of the primary side input voltage with a simple circuit arrangement without using an expensive element.

Further, in the present invention, the voltage reduction detection circuit includes the diode having the cathode connected to the non-grounded side terminal of the secondary winding, the first resistor having one terminal connected to the anode of the diode, the capacitor having one terminal connected to the anode of the diode and the other terminal connected to the secondary side ground, the second resistor having one terminal connected to the other terminal of the first resistor and the other terminal connected to the positive DC output, and the transistor having the base connected to the other terminal of the first resistor and the emitter connected to the secondary side ground, whereby the reduction signal is obtained from the collector of the transistor.

That is, since the voltage reduction detection circuit is arranged in a manner that the positive level voltage of the DC output and the negative level voltage generated at the secondary winding are applied to the voltage dividing circuit and the reduction signal is outputted when the output voltage of the voltage dividing circuit becomes higher than the voltage necessary for flowing the current into the base of the transistor. Accordingly, the circuit arrangement of the voltage reduction detection circuit can be simplified.

What is claimed is:

1. A switching power supply comprising:

a primary winding;

a switching circuit for switching a current flowing through said primary winding;

a secondary winding from which an output current is taken out when said switching circuit is turned off;

a load device which includes a control input for decreasing an amount of consumption power thereof and to which a DC output is supplied when said switching circuit is turned off; and a voltage reduction detection circuit for detecting a voltage generated at said secondary winding when said switching circuit is in an on-state and for outputting to said control input a reduction signal representing reduction of an input voltage of the side of said primary winding when the detected voltage is out of a predetermined range.

2. The switching power supply according to claim 1, wherein said voltage reduction detection circuit includes:

a diode having a cathode connected to a non-grounded side terminal of said secondary winding;

a first resistor having one terminal connected to an anode of said diode;

a capacitor having one terminal connected to the anode of said diode and the other terminal connected to a secondary side ground;

a second resistor having one terminal connected to the other terminal of said first resistor and the other terminal connected to a positive DC output; and a transistor having a base connected to said other terminal of said first resistor and an emitter connected to the secondary side ground, wherein the reduction signal is taken out from a collector of said transistor.

3. The switching power supply according to claim 2, wherein said voltage reduction detection circuit further includes:

a third resistor having one terminal connected to the anode of said diode and the other terminal connected to said one terminal of said first resistor and said one terminal of said capacitor; and a fourth resistor having one terminal connected to said other terminal of said third resistor and the other terminal connected to the secondary side ground.

4. The switching power supply according to claim 1, wherein said load device is a television set.

* * * * *